(No Model.) 2 Sheets—Sheet 2.
J. S. MATHEWS.
ROTARY SICKLE CUTTER BAR.
No. 493,103. Patented Mar. 7, 1893.
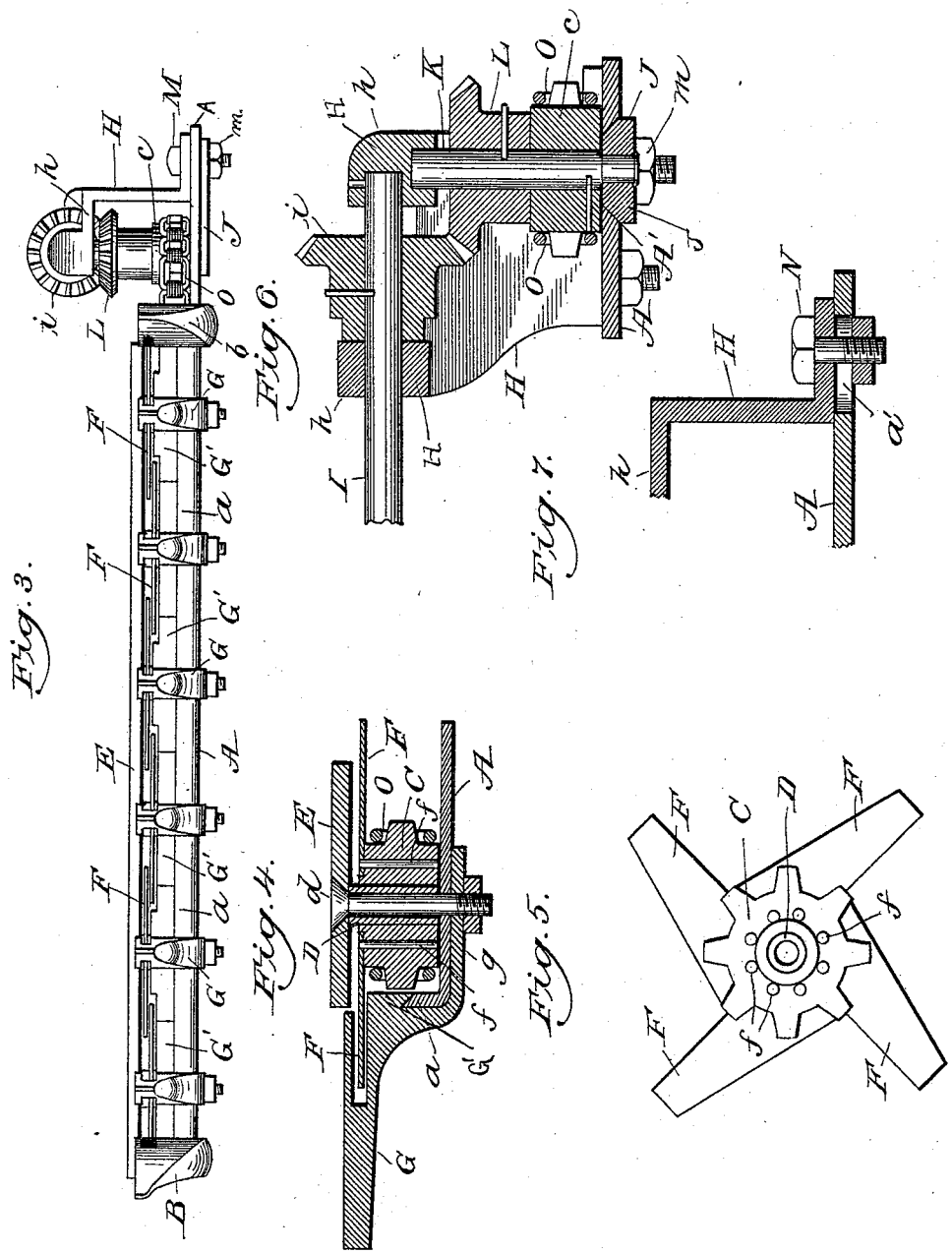
Witnesses:
Wm. A. Schoenborn.
R. W. Seville.
Inventor:
John S. Mathews
by
Alexander & Dowell
attys

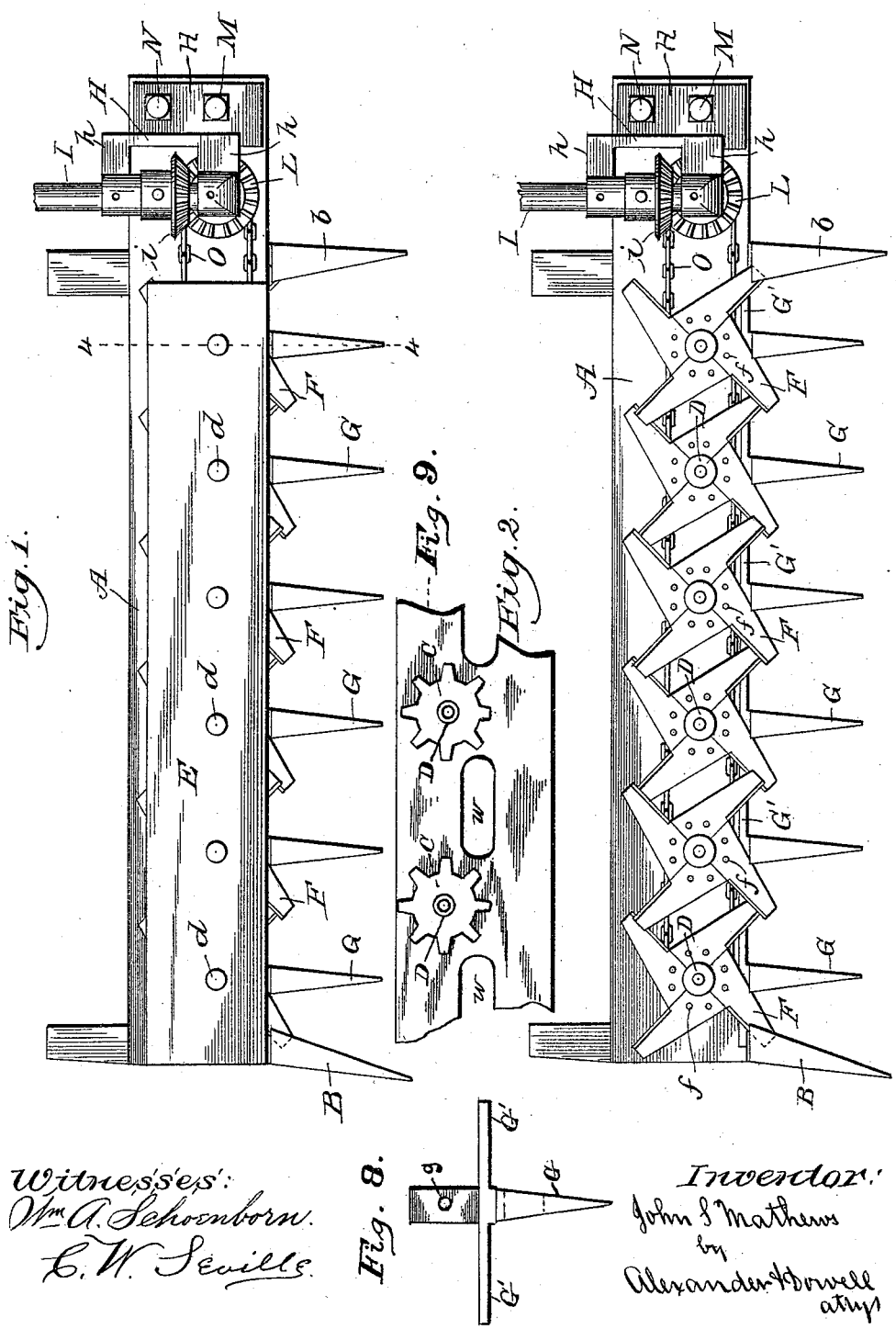

UNITED STATES PATENT OFFICE.

JOHN SMITH MATHEWS, OF PENDLETON, OREGON.

ROTARY-SICKLE CUTTER-BAR.

SPECIFICATION forming part of Letters Patent No. 493,103, dated March 7, 1893.

Application filed May 2, 1892. Serial No. 431,556. (No model.)

*To all whom it may concern:*

Be it known that I, JOHN SMITH MATHEWS, of Pendleton, in the county of Umatilla and State of Oregon, have invented certain new and useful Improvements in Rotary-Sickle Cutters-Bars; and I do hereby declare that the following is a full, clear, and exact description thereof, reference being had to the accompanying drawings, and to the letters of reference marked thereon, which form part of this specification, in which—

Figure 1 is a top plan view of my improved rotary sickle cutter-bar for mowers and reapers, &c. Fig. 2 is a similar view of the same with top-plate removed. Fig. 3 is a front edge view. Fig. 4 is a transverse sectional view on line 4—4 Fig. 1. Fig. 5 is a bottom view of one of the sprockets and attached cutter knives. Fig. 6 a partly sectional view of the driving gearing. Fig. 7 is a detail. Fig. 8 is a detail top view of a finger, and Fig. 9 is a detail view showing perforations in the bottom plate.

This invention is an improvement in the cutting apparatus of mowers, reapers and similar machines for cutting grass and grain, and it consists in the improved construction of the cutter bar, and of the rotary cutting knives, and the combination of the same, and in other novel details of construction and combinations of parts as will be hereinafter clearly described and claimed.

Reference being had to the drawings by letters;—A designates the bottom plate of the cutter bar, preferably of metal, and of a length regulated by the width of "cut" desired for the machine. On the front edge of the plate is a low upstanding flange $a$ which is beveled on its inner edge as shown. B and $b$, are the two main guard fingers and runners at the opposite ends of the bar, regulating the width of the "cut" as usual. The flange $a$ extends from one of said runners to the other, and the plate extends beyond runner $b$ sufficiently to allow of its connection to the machine by which the cutter bar is carried, and also to allow the attachment of the driving gearing of the revolving cutters as hereinafter described.

C, C, designate a series of equidistant sprocket wheels lying upon plate A and journaled on sleeves D, D, confined to plate A by bolts $d, d$, which extend through openings in the bottom plate A and in a superimposed top plate E. Plates A, E, are separated by the sleeves D, but are firmly united by the bolts $d, d$, and nuts thereon as shown, so that the plates, sleeves and bolts form a stiff trussed cutter bar, which will not bend. The hubs of sprockets C, C, are slightly shorter than sleeves D, so that the sprockets will not bind against or between plates A and E.

F, F, are cutter knives attached to the sprockets C, preferably four knives are attached to each sprocket. These knives are of such form that when riveted to the sprockets their bases abut, so that when the set of knives are secured to the spockets they brace each other, and the base of one knife abuts against the front edge of the succeeding knife, and also against the hub of sprocket as shown. The knives are preferably secured to the sprockets by rivets $f$ so that they can be readily removed or replaced. The cutting edges of the knives stand radial to the hub of sprocket. The knives will project beyond the front edges of plates A, E, but are otherwise entirely protected and shielded by said plates top and bottom. The hubs of every other sprocket are made the thickness of a knife blade shorter than the adjoining sprockets so that the knives thereon will underlie the knives of the adjoining sprockets, thus enabling the knives as revolved to work between each other and operate along the whole edge of bar.

G, G, are guard fingers having the usu1 ledger recesses and guards; and having transversely extending face pieces, G', which lie between the flange $a$ and front edge of plate E, the lower edge of pieces G' being beveled oppositely to the bevel of flange $a$, so as to fit thereagainst. Each guard finger has a depending arm $g$, which extends under plate A and is bolted thereto by the bolt $d$ upon which the adjoining sprocket is journaled there being a guard finger for each sprocket or rotary cutter. The fingers are securely held in position by said bolts, and the oppositely beveled edges of pieces G' and flange $a$.

The pieces G' are of such width that when the guard fingers are in position, these pieces in connection with flange $a$ close the space between the front edges of plates A, E, leaving only a sufficient space between the tops of pieces G' and the plate E to permit the knives to work through.

The guard pieces G' in front of the shorter hub sprockets (which carry the underlying knives) are cut lower than the other pieces G' to permit the free operation of the knives. The object of the flange a and these guide pieces G' is to prevent choking of the cutter by grass &c, which might otherwise enter between the plates A, E, and clog the sprockets. The opposite bevels of the pieces G' and flange a prevent lateral vibration of the fingers when arms g' are bolted to the bottom plate as described. These pieces and said flange also protect the driving sprocket chain and keep it in mesh with the sprockets as hereinafter specified.

H designates a bracket having an upstanding portion formed with two horizontal arms h, h, at its upper end in which is journaled a shaft I. i, is a bevel gear on said shaft between said arms.

J is a plate secured to the bracket below the forward arm h, and K is a vertical stub shaft journaled in the forward arm h and in the plate J, as shown, and on this shaft are secured a bevel gear L meshing with gear i, and a sprocket wheel c.

Plate J lies in a longitudinal slot A' in the end of plate A, the edges of said plate being preferably beveled to engage the oppositely beveled edges of the slot, and M is a bolt transfixing said plate and a flange on the bottom of the bracket, and secured by a nut m which locks the bracket and plate together and also confines them to the plate A. The bracket is further secured to the plate A by a bolt N transfixing the bottom flange of the bracket and a slot a' in the plate. By this construction the bracket with its gears can be adjusted longitudinally on plate A as is evident.

O is a sprocket chain by which motion is transmitted from sprocket c to all the sprockets C, the chain running between the front edges of the sprockets and the flange a, by which it is kept in contact with the sprockets, and then turning round the endmost sprocket C extends back of the several sprockets to sprocket c, so that all the several sprockets C will be simultaneously revolved in the same direction.

The shaft I is driven from the machine gearing, not shown, in any suitable manner, so as to revolve the cutter knives when desired, and by adjusting the position of the bracket H on plate A, the tension of the sprocket chain is regulated.

There are as many sprockets C and their knives in the bar, as the length thereof will admit, and according to the width of swath to be cut. The guard fingers and runners are set close to the guard fingers proper, so that the bar cannot choke.

In operation, the sprocket chain being driven by gearing, revolves the several sprockets with their knives, and there being four knives on each sprocket, they cut rapidly, and effectively shearing the grain against the ledger plates on the guard fingers and against the guard pieces G'. When it is desired to sharpen the knives or any knife on a sprocket, by loosening the sprocket chain, and then removing the proper bolt d, the sprocket with its knives can be removed; so can the corresponding guard finger.

The end sprocket wheels may have eight teeth, then all intermediate sprocket wheels will have nine teeth; this arrangement allows the chain to work close to the hub on end wheels, while on all intermediate wheels the chain will work on teeth of sprocket wheels at the pitch line. The sprocket wheels are set in such position on bottom plate as to just give clearance to teeth of wheels along the facing made by flange of bottom plate and face plates of guards preventing chain from passing sprocket wheels without engaging the teeth thereof. The endless sickles may be geared for driving at one or both ends of cutting bar. The end guards will be spaced one half the distance of intermediate guards.

The bottom plate has a series of perforations w, w, in it intermediate the sprockets and about in line with the rear edges thereof as indicated in Fig. 9 to allow any short cut grain or grass that may be drawn through with the knives to fall through the plate and not fill up around or clog the sprockets.

The cutting edge of each knife secured to the sprocket lies next to the rear edge of the adjoining blade, and stands at an angle of more than ninety-five degrees thereto so that the knives can be ground while on the sprockets upon a common grind stone rapidly, and can be readily sharpened with files. Should any knife break it can be removed and a new one riveted to the sprocket readily but the breakage of a single knife will not seriously impair the machine as it can still operate effectively should there be no convenient means at hand for replacing the broken knife.

Where four knives are fixed to each sprocket at least two of the knives are entirely inactive while the others are working, so that each knife has a rest after working.

The several knives revolve in the same direction, and the jarring incident to reciprocating cutter bars is entirely obviated making the machine less noisy and much easier riding, than the ordinary reciprocating bar cutters.

Having described my invention, what I claim as new, and desire to secure by Letters Patent thereon, is—

1. The combination of the plate having an upturned beveled flange on its front edge, the guard fingers, the sprockets mounted on said plate, the knives attached to said sprockets and adapted to overreach said flange, the sprocket chain and mechanism for driving the same, and the guard fingers having beveled guide fingers G', substantially as described.

2. The combination of a cutter bar, a series of revoluble wheels journaled thereon, and a set of interchangeable triangular knives F sharpened on one edge independently and removably secured to one end of each wheel, and means for revolving the wheels, substantially as described.

3. The combination of the cutter bar composed of two plates separated by sleeves and united by bolts passing through the sleeves; with sprocket wheels journaled on said sleeves and having removable interchangeable knives independently secured to their hubs, and the sprocket chain and gearing for driving said wheels, substantially as described.

4. The combination of the cutter bar and sprocket wheels thereon carrying cutters; with the bracket H adjustably bolted to the end of said bar to enable the tension of the chain to be regulated; the shaft K, gear L, and sprocket $c$, chain O and shaft I and gear $i$, substantially as and for the purpose specified.

5. The combination of the plate A having upturned flange $a$ with the fingers G having extensions $g$, under the plate and bolted thereto and lateral extensions G' overlying the flange $a$, substantially as described.

6. The combination of the plate A having upturned flange $a$ with the fingers G having extensions $g$, under the plate and bolted thereto, and lateral extensions G' overlying the flange $a$; with the wheels journaled on the bar in rear of the flange, and the cutters carried by said wheels adapted to project beyond and over said flange and extension, and means for revolving said wheels, substantially as described.

7. The combination of the bar, the revoluble wheels thereon carrying interchangeable and independently removable cutter knives, and the guard fingers in front of the wheels having lateral extensions, and rear extensions underlying, and, secured to the bar by the same bolts that the wheels are journaled on, substantially as and for the purpose set forth.

8. The combination of the cutter bar having slots A' and $a'$ in its end, the bracket H and plate J bolted thereto, the shaft K journaled in said bracket and plate, and the bevel gearing for driving said shaft, substantially as described.

9. The combination of the cutter bar having slots A' and $a'$ in its end, the bracket H and plate J bolted thereto, the shaft K journaled in said bracket and plate, and the gearing for driving said shaft; with the sprocket wheels journaled on the bar, the cutters carried thereby, and the sprocket chain for driving said wheels from shaft K, all constructed and arranged to operate substantially as described.

In testimony that I claim the foregoing as my own I affix my signature in presence of two witnesses.

JOHN SMITH MATHEWS.

Witnesses:
   CHAS. A. CAMERON,
   E. L. SMITH.